United States Patent
Toba

[19]

[11] Patent Number: 5,771,469
[45] Date of Patent: Jun. 23, 1998

[54] PORTABLE TELEPHONE

[75] Inventor: Hiroyuki Toba, Saitama, Japan

[73] Assignee: NEC Corporation, Tokyo, Japan

[21] Appl. No.: 843,625

[22] Filed: Apr. 10, 1997

[30] Foreign Application Priority Data

Apr. 12, 1996 [JP] Japan ................................ 8-091454

[51] Int. Cl.$^6$ ....................................... H04B 1/06
[52] U.S. Cl. ........................ 455/566; 455/345; 455/346; 455/550
[58] Field of Search ............................. 455/99, 145, 345, 455/346, 550, 566, 575; 345/127, 130

[56] References Cited

U.S. PATENT DOCUMENTS 5,386,218  1/1995  Yano et al. .

*Primary Examiner*—Reinhard J. Eisenzopf
*Assistant Examiner*—Makoto Aoki
*Attorney, Agent, or Firm*—Scully, Scott, Murphy & Presser

[57] ABSTRACT

In a portable telephone, when the portable telephone is used for telephone on-vehicle use, the content of displaying is easy to recognize because character size to be displayed is capable of enlarging voluntarily. An input circuit is interfaced with an on-vehicle equipment (not illustrated). An on-vehicle connection detecting circuit detects connection to the on-vehicle equipment, thus outputting on-vehicle detection signal. A selection control circuit outputs an enlargement instruction signal instructing whether it allows normal size of character used on portable condition to display or it allows enlarged size of character to display after receiving an on-vehicle detection signal, and outputting displaying control signal after receiving a hook detection signal. A character storage circuit outputs stored character data after receiving the enlargement instruction signal or the displaying control signal. A displaying control circuit outputs a displaying signal after receiving the character data. An indicator displays characters by virtue of the displaying signal. A hook detection circuit outputs a hook detection signal after judging whether or not the portable telephone is fastened.

6 Claims, 3 Drawing Sheets

F I G. 2A
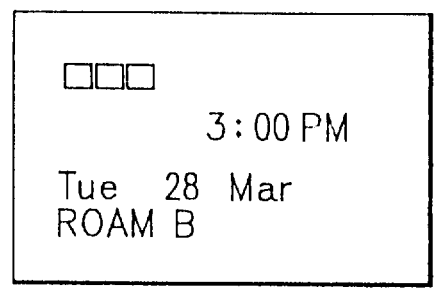
F I G. 2B
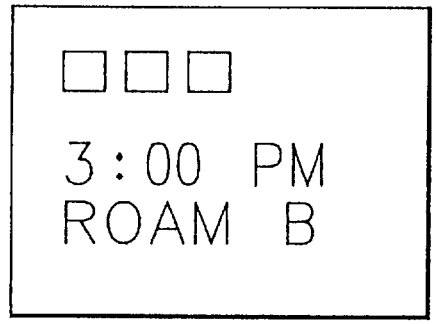

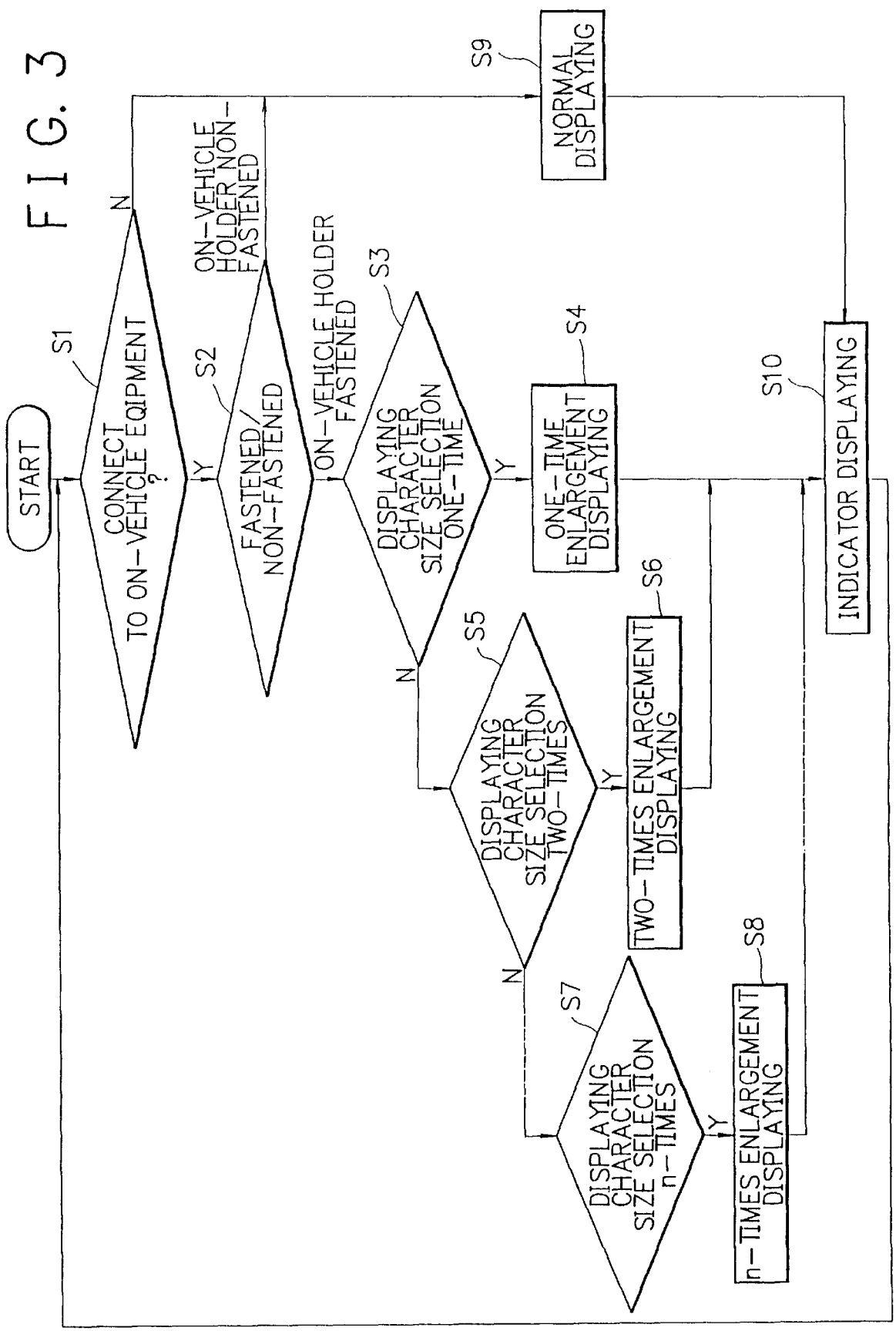

PORTABLE TELEPHONE

BACKGROUND OF THE INVENTION

The present invention relates to a portable telephone, and in particular to a portable telephone which is capable of changing dimensions of displaying size for character and so forth.

DESCRIPTION OF THE PRIOR ART

Generally, in most case of the conventional displaying method of character and so forth of the portable telephone, as to dimensions of character size, a character, an icon, and an alpha-numeric character (hereinafter giving a generic name as a character) is fixed with the same dimensions of character size. In particular, dimensions of these character size are incapable of being changed no matter whether or not the portable telephone is used on-vehicle use thereof.

There is a portable telephone which displays an enlarged character only in cases where a counter-telephone number is inputted. However there is no discrimination in the service condition no matter whether or not the portable telephone is used on-vehicle use. The dimensions of character size for portable use is also used on-vehicle condition.

The above-described conventional portable telephone, the dimensions of displayed character size is always fixed. Since the dimensions of displaying character size for portable telephone is incapable of being changed no matter whether or not the portable telephone is used for on-vehicle use, when the portable telephone is used for on-vehicle use, the characters are difficult to see because the dimensions of character size is too small to see, caused by the on-vehicle placed location of the portable telephone. There is defect that the contents of displaying are difficult to recognize because of this condition.

SUMMARY OF THE INVENTION

In view of the foregoing, it is an object of the present invention to provide a portable telephone in cases where which is used for the telephone on-vehicle use, dimensions of character size to be displayed is capable of being enlarged voluntarily, with the result that recognition of the contents of displaying becomes easy.

According to one aspect of the present invention, for achieving the above-mentioned object, there is provided a portable telephone with an indicator consisting of following elements: There is provided connecting means for connecting to an on-vehicle equipment. There is provided first detection means for detecting condition that the portable telephone is connected by the connecting means. There is provided selection means for selecting dimensions of the character size for displaying after receiving a first detection signal outputted by the first detection means. There is provided storage means for storing various kinds of dimensions of character size. And there is provided displaying means for displaying characters selected out of the storage means by virtue of a selection signal outputted by the selection means.

According to another aspect of the invention, there is provided a portable telephone with an indicator consisting of the following elements: There is provided connecting means for connecting to an on-vehicle equipment. There is provided first detection means for detecting condition that the portable telephone is connected by the connecting means. There is provided second detecting means for detecting whether or not the portable telephone is fastened to an on-vehicle holder. There is provided selection means for selecting dimensions of character size for displaying after receiving either a first detection signal outputted by the first detection means or a second detection signal outputted by the second detection means. There is provided storage means for storing various kinds of dimensions of character size, and displaying means for displaying characters selected out of the storage means by virtue of a selection signal outputted by the selection means.

In the above-described portable telephone, the storage means stores at least more than two kinds of dimensions for characters, icons, and alpha-numeric characters.

According to another aspect of the invention there is provided a portable telephone with an indicator consisting of the following elements: There is provided an interface circuit for connecting to an on-vehicle equipment. There is provided an on-vehicle connection detecting circuit for outputting on-vehicle detection signal after detecting connection to said on-vehicle equipment. There is provided a selection control circuit for outputting enlargement instruction signal instructing whether it causes normal size character using for portable condition to display or it causes enlarged character to display after receiving the on-vehicle detection signal. There is provided a character storage circuit for outputting character data with instructed size after receiving the enlargement instruction signal. There is provided a displaying control circuit for outputting displaying signal after receiving the character data. And there is provided an indicator for displaying characters with instructed size by virtue of the displaying signal.

According to another aspect of the invention there is provided a portable telephone with an indicator consisting of following elements: There is provided an interface circuit for connecting to an on-vehicle equipment an on-vehicle connection detecting circuit for outputting on-vehicle detection signal after detecting connection to the on-vehicle equipment. There is provided a selection control circuit for outputting enlargement instruction signal instructing whether it causes normal size character using on portable condition to display or it causes enlarged character to display after receiving the on-vehicle detection signal. There is provided for outputting displaying control signal after receiving hook detection signal. There is provided a character storage circuit for outputting character data with instructed size after receiving either the enlargement instruction signal or the displaying control signal. There is provided a displaying control circuit for outputting displaying signal after receiving the character data. There is provided an indicator for displaying characters with instructed size by virtue of the displaying signal. And there is provided a hook detecting circuit for outputting the hook detection signal after judging whether or not the portable telephone is fastened.

The above and further objects and novel features of the invention will be more fully understood from the following detailed description when the same is read in connection with the accompanying drawings. It should be expressly understood, however, that the drawings are for purpose of illustration only and are not intend as a definition of the limits of the invention.

BRIEF DESCRIPTION OF THE DRAWINGS

FIG. 2A is a view showing a displaying example of normal size character used for portable condition;

FIG. 2B is a view showing a displaying example of enlarged size character used for on-vehicle condition; and FIG. 3 is a flow sheet showing the operation of the embodiment of FIG. 1.

DETAILED DESCRIPTION OF THE PREFERRED EMBODIMENTS

Figure 1:
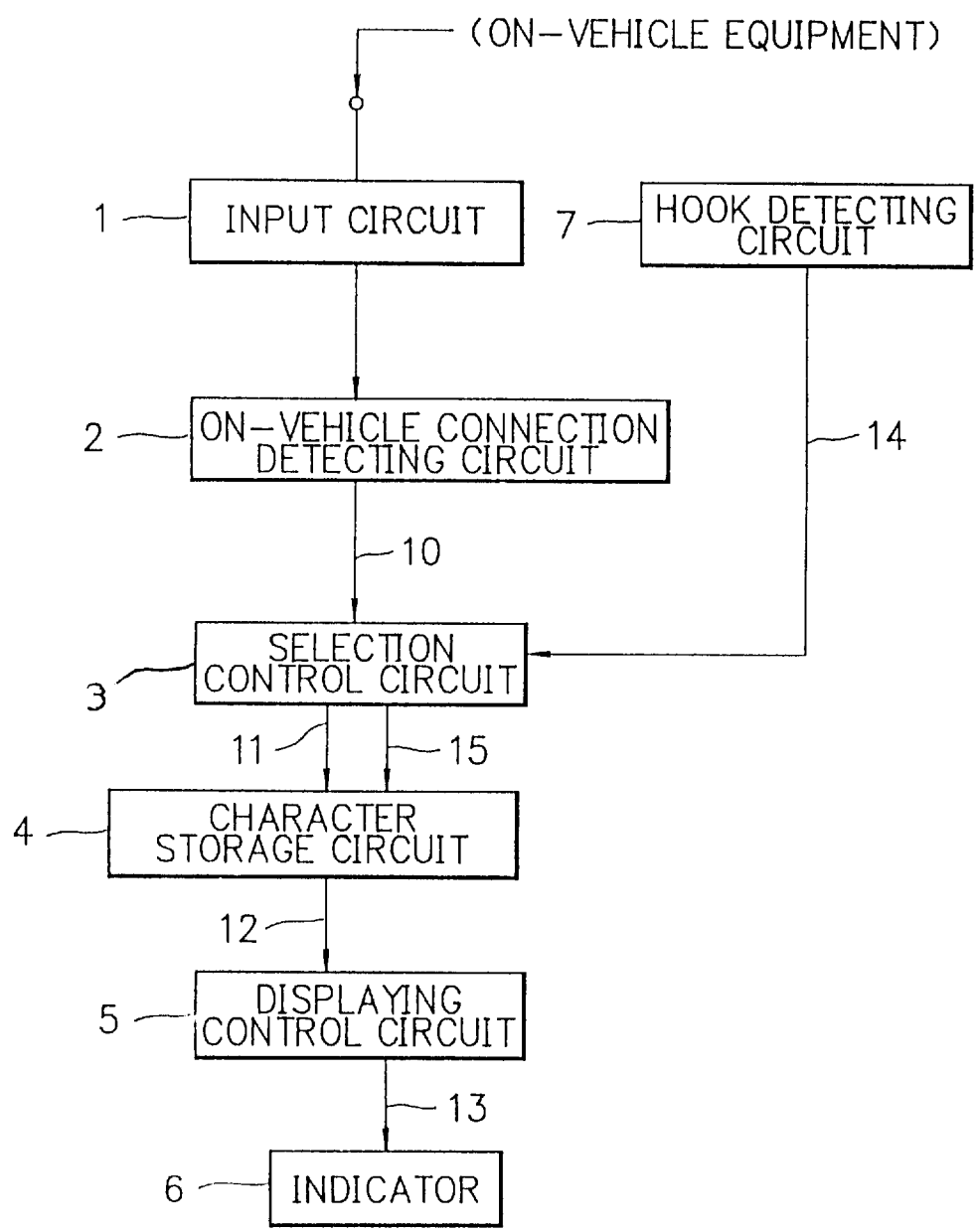
FIG. 1 is a block diagram showing an embodiment of a portable telephone according to the present invention.

A preferred embodiment of the present invention will now be described in detail referring to accompanying drawings.

FIG. 1 is a block diagram showing one embodiment of a portable telephone of the present invention.

The embodiment showing FIG. 1, comprises an input circuit 1 connected to an on-vehicle equipment (not illustrated) to interface for the purpose of external power source supply, an on-vehicle connection detecting circuit 2 for detecting connection to the on-vehicle equipment before outputting an on-vehicle detection signal 10, a selection control circuit 3 which outputs an enlargement instruction signal 11 for instructing whether normal size characters used in portable condition are displayed or enlarged size characters are displayed, after reception of the on-vehicle detection signal 10, and which receives a hook detection signal 14, thus outputting a displaying control signal 15, a character storage circuit 4 for outputting character data 12 stored therein, after receiving the enlargement instruction signal 11 or the displaying control signal 14, a displaying control circuit 5 for outputting a displaying signal 13, after receiving character control data 12, an indicator 6 for displaying character in virtue of the displaying signal 13, and a hook detection circuit 7 which judges whether or not the portable telephone is fixed, thus outputting a hook detection signal 14.

FIG. 2A is a displaying example showing a normal size character used for portable condition. FIG. 2B is a displaying example showing enlarged size character used for on-vehicle condition.

Next, operation of the embodiment of the portable telephone will be described in detail referring to FIG. 1, FIG. 2A, and FIG. 2B.

A portable telephone is carried in a fixed location within a vehicle. The portable telephone is connected to an on-vehicle equipment through an input circuit 1. Here, the on-vehicle equipment means, for example, a power supply equipment which performs power-supplying to the portable telephone equipment. The on-vehicle connection detecting circuit 2 judges whether or not the portable telephone is connected to the on-vehicle equipment. When the portable telephone is connected to the on-vehicle equipment, the on-vehicle connection detecting circuit 2 outputs the on-vehicle detection signal 10 showing connected condition thereof to the selection control circuit 3.

When the selection control circuit 3 receives the on-vehicle detection signal 10, it causes an enlargement instruction signal 11 to output to the character storage circuit 4. The enlargement instruction signal 11 instructs about displaying enlarged character when the portable telephone is connected to the on-vehicle equipment. The character storage circuit 4 stores various size data, by virtue thereof, character, icon, and alpha-numerical character which are established beforehand, are enlarged to display. The character storage circuit 4 outputs the character control data 12 for enlarging character to display to the displaying control circuit 5 based upon the contents of instruction of the enlargement instruction signal 11.

When the displaying control circuit 5 receives the character control data 12, the displaying control circuit 5 outputs the displaying signal 13 to drive the indicator 6. The indicator 6 displays enlarged size character shown in FIG. 2B.

The on-vehicle detection signal 10 denotes non-connected condition when no portable telephone is connected to the on-vehicle equipment. When the portable telephone is not connected to the on-vehicle equipment, it causes the non-connected on-vehicle detection signal 10 to output to the selection control signal 3. The enlargement instruction signal 11 which instructs so as to perform displaying of normal size character used in portable condition is outputted to the character storage circuit 4. The character storage circuit 4 outputs the character control data 12 for performing displaying of normal size by virtue of the content of instruction of the enlargement instruction signal 11 to the displaying control circuit 5. When the displaying control circuit 5 receives the character control data 12, the displaying control circuit 5 outputs the displaying signal 13, thus driving the indicator 6. The indicator 6 displays the normal size character shown in FIG. 2A.

According to the above stated case, the operation is the case where the portable telephone is carried in the vehicle and connected to the on-vehicle equipment. There is the case where an on-vehicle holder is used for the purpose of fastening the portable telephone on the inside of the vehicle. The hook detection circuit 7 judges whether or not the portable telephone is mounted on the on-vehicle holder. When the portable telephone is fastened on the on-vehicle holder, the hook detection circuit 7 outputs the hook detection signal 14 to the selection control circuit 3. When the selection control circuit 3 receives the hook detection signal 14, the selection control circuit 3 outputs the displaying control signal 15 so as to perform enlarging to display to the character storage circuit 4. The character storage circuit 4 stores various size data, by virtue thereof, character, icon, and alpha-numerical character which are established beforehand, are enlarged to display. The character storage circuit 4 outputs the character control data 12 for enlarging character to display to the displaying control circuit 5 based upon the contents of instruction of the displaying control signal 15. The displaying control circuit 5 receives the character control data 12, the displaying control circuit 5 outputs the displaying signal 13, thus driving the indicator 6. The indicator 6 displays the enlarged character as shown in FIG. 2B.

When the portable telephone is not fastened to the on-vehicle holder, the hook detection circuit 7 outputs the hook detection signal 14 which denotes that the portable telephone is not fastened thereto to the selection control circuit 3. The hook detection circuit 7 outputs displaying control signal 15 instructing the normal size displaying to the character storage circuit 4. The character storage circuit 4 outputs the character control data 12 instructing the normal size displaying by virtue of the contents of instruction of the displaying control signal 15 to the displaying control circuit 5. When the displaying control circuit receives the character control data 12, the displaying control circuit 5 outputs the displaying signal 13, thus driving the indicator 6. The indicator 6 displays the normal size character as shown in FIG. 2A.

FIG. 3 is a flow chart showing operation of the embodiment of the portable telephone of FIG. 1.

At STEP S1: There is judged whether or not the portable telephone is connected to the on-vehicle equipment. When the portable telephone is not connected to the on-vehicle equipment, going to STEP S9 wherein it causes the normal size character displaying to implement. When the portable telephone is connected to the on-vehicle equipment, going to STEP S2.

At STEP S2: There is judged whether or not the portable telephone is fastened to the on-vehicle holder. When the portable telephone is not fastened to the on-vehicle holder, going to STEP S9 wherein it causes the normal size character displaying to implement. When the portable telephone is fastened to the on-vehicle holder, going to STEP S3.

When flow proceeds to STEP S9, the character is displayed with normal size (STEP S10), after displaying the normal size character, flow returns to STEP S1.

The dimensions of the character-size is capable of being chosen voluntarily as 1 time (normal size), 2 times, . . . n times, in case of selection for displaying of character size.

At STEP S3: When one time of normal size is chosen, it allows one-time enlargement displaying procession to perform (STEP S4), with the result that the character is displayed on the indicator as the character size is normal (STEP S10).

At STEP S3: When one-time of normal size is not chosen, flow proceeds to STEP S5. At STEP S5: When two-times of character size is chosen, it allows two-times enlargement displaying procession to perform (STEP S6), thus displaying two-times enlarged character (STEP S10). At STEP S5: When two-times of character size is not chosen, flow proceeds to STEP S7.

At STEP S7: When n-times of enlarged character size is chosen, it allows n-times enlargement displaying procession to perform (STEP S8), thus displaying n-times enlarged character on the indicator (STEP S10).

As described-above, the displaying size of character is always changeable.

Constitution for choosing to instruct the displaying size of character is not necessarily to limit to this constitution. It is possible to provide with constitution, for example, excluding the hook detection circuit 7. In this case, STEP S2 is eliminated.

Furthermore, the portable telephone according to the present invention is not necessarily to limit to the on-vehicle use for automobile.

As described above, the portable telephone according to the present invention, since when the portable telephone is used for on-vehicle use, the character size is changeable to voluntary dimension, there is the effect that the contents of displaying become easy to recognize.

While preferred embodiments of the invention have been described using specific terms, such description is for illustrative purpose only, and it is to be understood that changes and variations may be made without departing from the spirit or scope of the following claims.

What is claimed is:

1. A portable telephone provided with an indicator comprising:

connecting means for connecting to an on-vehicle equipment;

a first detection means for detecting condition that said portable telephone is connected by said connecting means;

selection means for selecting character size for displaying after receiving a first detection signal outputted by said first detection means;

storage means for storing various kinds of character size; and displaying means for displaying characters selected out of said storage means by virtue of a selection signal outputted by said selection means.

2. A portable telephone provided with an indicator comprising:

connecting means for connecting to an on-vehicle equipment;

a first detection means for detecting condition that said portable telephone is connected by said connecting means;

a second detecting means for detecting whether or not said portable telephone is fastened to an on-vehicle holder; selection means for selecting character size for displaying after receiving either a first detection signal outputted by said first detection means or a second detection signal outputted by said second detection means;

storage means for storing various kinds of character size; and displaying means for displaying characters selected out of said storage means by virtue of a selection signal outputted by said selection means.

3. A portable telephone according to claim 1, wherein said storage means stores at least more than two kinds of dimension for characters, icons, and alpha-numeric characters.

4. A portable telephone according to claim 2, wherein said storage means stores at least more than two kinds of dimension for characters, icons, and alpha-numeric characters.

5. A portable telephone provided with an indicator comprising:

an interface circuit for connecting to an on-vehicle equipment;

an on-vehicle connection detecting circuit for outputting on-vehicle detection signal after detecting connection to said on-vehicle equipment;

selection control circuit for outputting enlargement instruction signal instructing whether it causes normal size character using on portable condition to display or it causes enlarged character to display after receiving said on-vehicle detection signal;

a character storage circuit for outputting character data with instructed size after receiving said enlargement instruction signal;

a displaying control circuit for outputting displaying signal after receiving said character data; and an indicator for displaying characters with instructed size by virtue of said displaying signal.

6. A portable telephone with an indicator comprising:

an interface circuit for connecting to an on-vehicle equipment;

an on-vehicle connection detecting circuit for outputting on-vehicle detection signal after detecting connection to said on-vehicle equipment;

selection control circuit for outputting enlargement instruction signal instructing whether it causes normal size character using on portable condition to display or it causes enlarged character to display after receiving said on-vehicle detection signal, and for outputting displaying control signal after receiving hook detection signal;

a character storage circuit for outputting character data with instructed size after receiving either said enlargement instruction signal or said displaying control signal;

a displaying control circuit for outputting displaying signal after receiving said character data;

an indicator for displaying characters with instructed size by virtue of said displaying signal; and a hook detecting circuit for outputting said hook detection signal after judging whether or not said portable telephone is fastened.

* * * * *